US010552614B2

(12) United States Patent
Nguyen et al.

(10) Patent No.: US 10,552,614 B2
(45) Date of Patent: Feb. 4, 2020

(54) AUTHENTICATION SYSTEM AND METHOD

(71) Applicant: Hewlett-Packard Development Company, L.P., Houston, TX (US)

(72) Inventors: Nam H Nguyen, Houston, TX (US); Chi So, Spring, TX (US); Shaheen Saroor, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 460 days.

(21) Appl. No.: 15/112,626

(22) PCT Filed: Jan. 31, 2014

(86) PCT No.: PCT/US2014/014161
§ 371 (c)(1),
(2) Date: Jul. 19, 2016

(87) PCT Pub. No.: WO2015/116166
PCT Pub. Date: Aug. 6, 2015

(65) Prior Publication Data
US 2016/0378992 A1    Dec. 29, 2016

(51) Int. Cl.
*G06F 7/04* (2006.01)
*G06F 21/57* (2013.01)
*G06F 21/35* (2013.01)
*G06F 9/4401* (2018.01)

(52) U.S. Cl.
CPC .......... *G06F 21/575* (2013.01); *G06F 9/4418* (2013.01); *G06F 21/35* (2013.01)

(58) Field of Classification Search
CPC ...... G06F 21/575; G06F 9/4418; G06F 21/35; H04L 9/3215; H04L 9/3234; H04L 2463/082
See application file for complete search history.

(56) References Cited

U.S. PATENT DOCUMENTS

| | | | |
|---|---|---|---|
| 8,296,565 B2 * | 10/2012 | Taylor | G06F 21/31 380/247 |
| 8,371,501 B1 | 2/2013 | Hopkins | |
| 2007/0094708 A1 | 4/2007 | Hess | |
| 2010/0011212 A1 | 1/2010 | Anemikos et al. | |
| 2010/0079243 A1 * | 4/2010 | Hamada | G06F 21/32 340/5.83 |
| 2011/0055606 A1 | 3/2011 | Wu et al. | |

(Continued)

FOREIGN PATENT DOCUMENTS

WO    WO-2009/066324 A2    5/2009

*Primary Examiner* — Shewaye Gelagay
*Assistant Examiner* — Carlton Johnson
(74) *Attorney, Agent, or Firm* — HP Inc. Patent Department (57) ABSTRACT

An example method includes receiving an indication of a first level of authentication for an electronic device, the first authentication being associated with a first authentication device associated with the user; receiving an indication of a second level of authentication for the electronic device, the second authentication being associated with a second authentication device associated with the user, the second authentication device being different from the first authentication device; and upon receiving the indication of at least the first level of authentication and the second level of authentication, allow access to the electronic device.

10 Claims, 5 Drawing Sheets

(56) References Cited

U.S. PATENT DOCUMENTS

2011/0289572 A1    11/2011  Skeel et al.
2012/0110341 A1*  5/2012  Beigi ................. G06Q 20/3223
                                                    713/186
2012/0311695 A1    12/2012  Kohlenberg et al.

* cited by examiner

AUTHENTICATION SYSTEM AND METHOD

BACKGROUND

Authentication of electronic devices, such as personal computers, is commonly achieved with a username and a password. Often, this requires a user to enter the information and wait for the device to start up, a process which can take substantial amount of time. Further, information such as a password can be easily compromised, leading to security issues.

BRIEF DESCRIPTION OF THE DRAWINGS

For a more complete understanding of various examples, reference is now made to the following description taken in connection with the accompanying drawings in which.

DETAILED DESCRIPTION

Various examples described herein provide improved security for electronic devices such as personal computers by providing multiple levels of authentication. Each level of authentication may be associated with a different authentication method or device. For example, an employee's office computer may have a first level of authentication based on detection of the employee's presence within the office building through, for example, a radio frequency identifier (RFID) badge scanned at the entrance of the building. Further authentication may be performed using a mobile device carried by the employee, such as a smart phone. The employee's computer may include a Bluetooth module that is paired with the employee's smart phone. When the employee is within range of the Bluetooth communication, the employee's computer may allow the user to login to the computer. Thus, in this example, two levels of authentication provide improved security. Further, at various levels of authentication, the computer may be transitioned to a different level of start-up such that little time is required for the employee to begin using the computer upon arrival at the computer.

Figure 1:
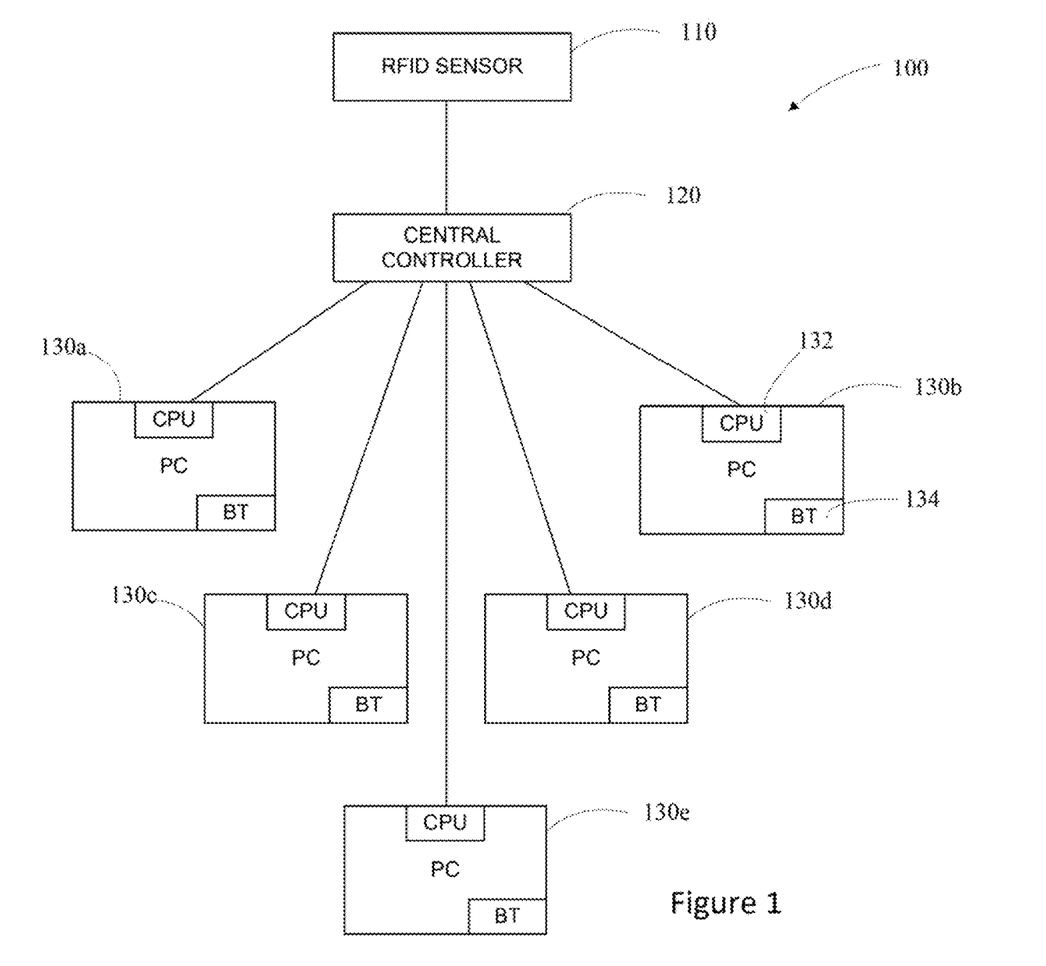
FIG. 1 illustrates an example system for authentication of an electronic device.

Referring now to FIG. 1, an example system for authentication of an electronic device is schematically illustrated. The system 100 includes a first authentication device 110. In the example of FIG. 1, the fast authentication device is an RFID sensor 110. The RFID sensor 110 may perform a first authentication and send an authentication signal to be used for authentication of an electronic device. In this regard, the RFID sensor 110 is coupled to a central controller 120, in various examples, the central controller 120 may be a central server for a building or an enterprise, for example. The central controller 120 may be an administrative unit and may communicate with numerous devices in the system 100, such as computers 130*a-e*. In this regard, the central controller 120 communicates with a central processor 132 of each computer 130*a-e* and may communicate the first authentication received from the RFID sensor 110. The first authentication may wake up or start up the computer, as described in greater detail below.

The system 100 further includes a second authentication device, in the example of FIG. 1, the second authentication device is provided on each computer 130*a-e*. In the example of FIG. 1, each computer 130*a-e* is provided with a second authentication device in the form of a Bluetooth module 134. In other examples, each computer 130*a-e* may be provided with a different communication module, for example, for short-distance communication. The second authentication, an example of which is described below in greater detail, may cause the computer to be in a ready mode. In various examples, the ready mode may only require the user to enter his/her password. All other startup functions for the computer may be performed as soon as the second authentication is completed.

Figure 2:
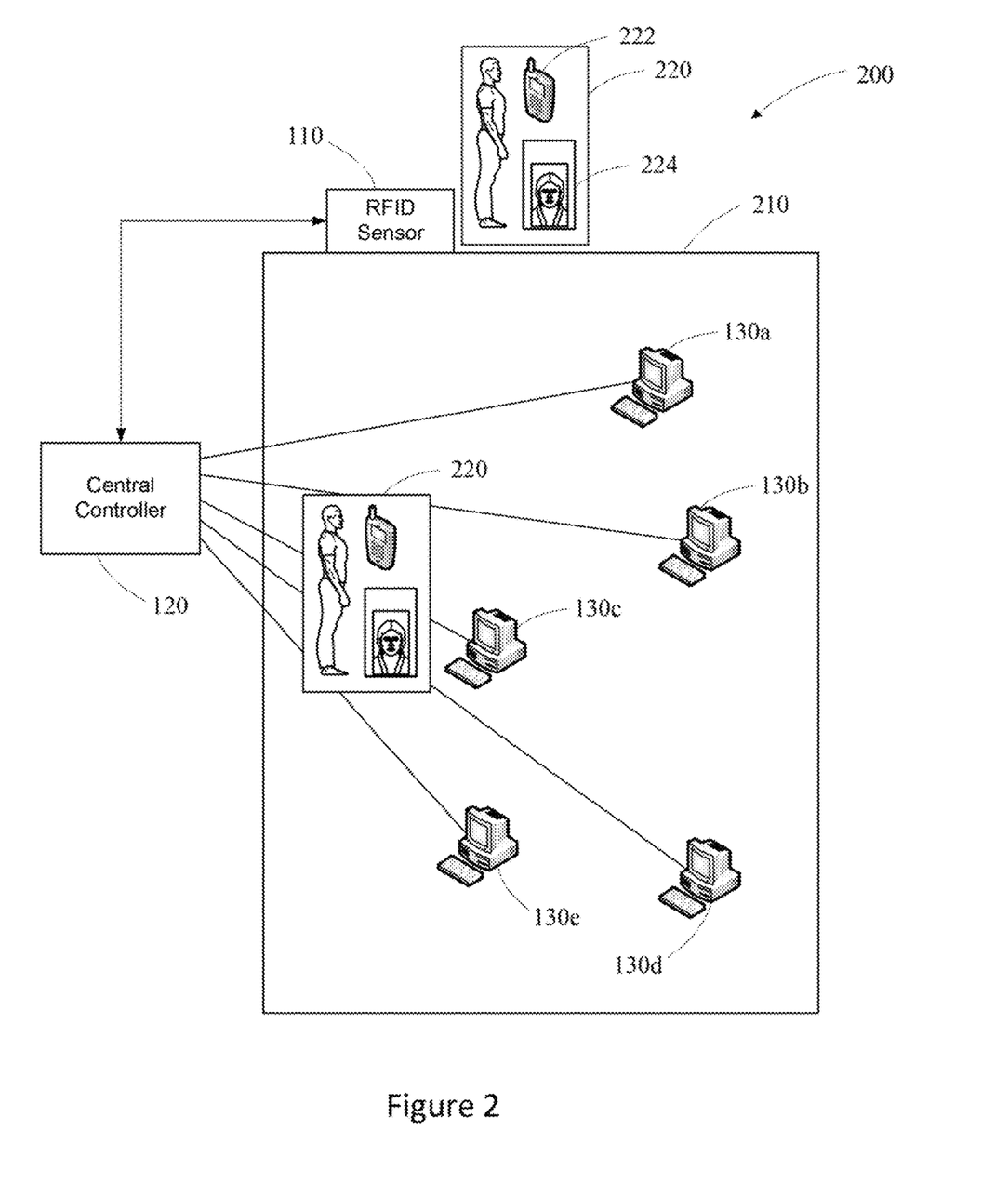
FIG. 2 illustrates an example implementation of the system of FIG. 1.

Referring now to FIG. 2, an example implementation of the system of FIG. 1 is illustrated. The system 100 of FIG. 1 may be implemented in a variety of manners. In the example of FIG. 2, the system is implemented in a building or a unit, such as an office. In other examples, the system may be implemented across a large enterprise including multiple buildings or locations. The buildings or locations may be geographically close or spread out throughout the world.

Referring again to the example of FIG. 2, the system 200 includes a building 210 which may contain the various computers 130*a-e*. The RFID sensor 110 may be positioned at an entrance to the building 210 through which each employee or user, such as user 220, passes to get to his/her computer. The user 220 may be provided with a first authentication identifier. In the example of FIG. 2, the first authentication identifier is a security badge 224, which may include his/her picture and other security information. Further, the security badge 224 may be provided with an authentication identifier, such as an RFID tag, a bar code or other identification which may be read or detected by a machine. In the example of FIG. 2, the security badge 224 includes an RFID tag which may be read by the RFID sensor 110 when the user 220 enters the building 210. The RFID tag may be read by the RFID sensor 110 based on proximity of the user's security badge 224 to the RFID sensor 110. In other examples, the user 220 may be required to scan the security badge 224 at a reader. In such examples, the reader may read any machine-readable identifier that may be provided on the security badge 224, such as a bar code.

Upon detecting the user's security badge via, for example, an RFID tag, the RFID sensor 110 may transmit a signal to the central controller 120 identifying the user and the location at which the user's RFID tag was detected. The central controller 120 may be positioned within the building 210 or in any offsite location. The communication between the RFID sensor 110 and the central controller 120 may be achieved in any of a variety of manners. For example, the RFID sensor 110 and the central controller 120 may be connected by a dedicated channel. In other examples, the communication may be through a network, such as a local network (wired or wireless) or a public network such as the Internet.

The central controller 120 may include a database associating the user 220 with one or more computers throughout the building 210 or the enterprise. For example, the central controller 120 may determine that the user 220 associated with the RFID tag detected by the RFID sensor 110 is also associated with the computer 130*c*. Thus, a first level of authentication may be achieved through detection of the RFID tag of the user 220. Upon achieving the first level of authentication, the central controller 120 may transmit a signal to the computer 130*c* associated with the user 220.

The signal from the central controller 120 may instruct the CPU of the computer 130c to start up or wake up. Thus, the boot-up process for the computer is started while the user 220 may still be at the entrance to the building. Thus, a first level of authentication may be achieved based on a first authentication identifier, such as the user's security badge.

After scanning his/her security badge at the entrance, the user 220 may proceed to his computer. A second level of authentication using a second authentication identifier may be performed before the computer is made available for use. In this regard, the user 220 may be provided with a second authentication identifier that is different from the first authentication identifier. In the example of FIG. 2, the first authentication identifier is the security badge 224, and the second authentication identifier is a mobile device, such as a smart phone 222, carried by the user 220. The smart phone 222 may have a Bluetooth module that is paired with the Bluetooth module 134 in the user's computer 130c. Bluetooth modules may have a range of up to 50 feet. Thus, when the user approaches his computer, which has already passed through the first authentication process, the Bluetooth module 134 of the user's computer 130c may detect the user's smart phone 222. Upon detection and pairing of the Bluetooth modules of the user's computer 130c and the smart phone 222, a second level of authentication may be achieved. In response, the computer's CPU may complete the boot-up process. In some examples, the successful completion of the second level of authentication may render the computer 130c ready for use. In other examples, the computer 130c may further require the user to enter a password or take other steps.

Figure 3:
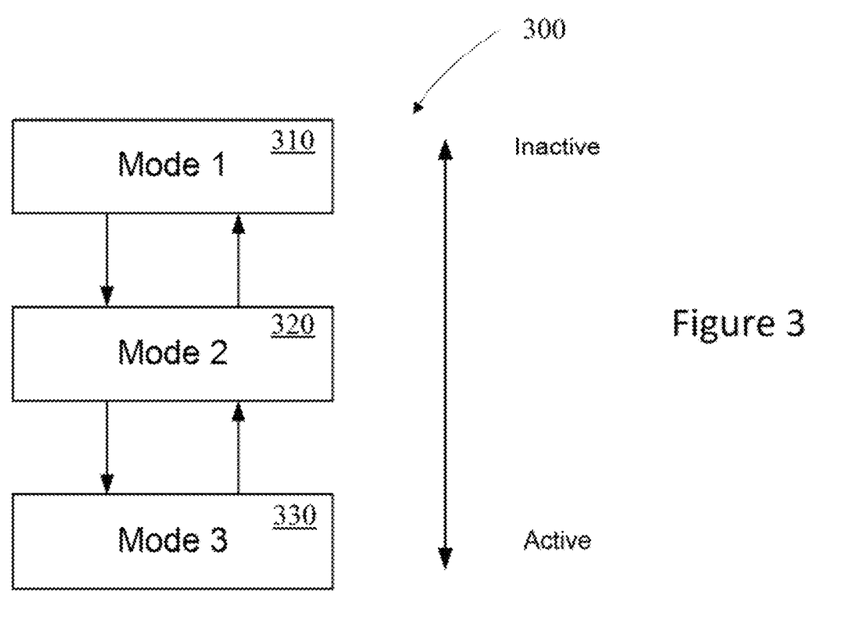
FIG. 3 is an example mode transition diagram.

Referring now to FIG. 3, an example mode transition diagram is illustrated. In the example of FIG. 3, three modes are shown. However, those skilled in the an will appreciate that other examples may include additional modes. Any practical number of modes may be used and are contemplated within the scope of the present disclosure.

The modes 310, 320, 330 represent the various modes that an electronic device, such as the computer 130c of FIGS. 1 and 2, may be in. As illustrated in FIG. 3, the various modes may range from a low level of activity, as indicated by the upper end of the double-arrow line in FIG. 3, to a high level of activity, as indicated by the lower end of the double-arrow line in FIG. 3. In various examples, the different modes may correspond to different levels of operation of the electronic device. For example, the first mode 310 may be associated with the electronic device being completely shut down. The second mode 320 may be associated with a sleep mode or a start-up mode. In this regard, certain aspects of the electronic device may be operational, but the device may not be ready for use. For example, the device may have started up using a profile for a certain user, but may not be in a sleep mode. Finally, in the third mode 330, the device may be ready for use by the certain user. As described below, the electronic device may transition from one mode to another based on the status of the different authentication levels.

Figure 4:
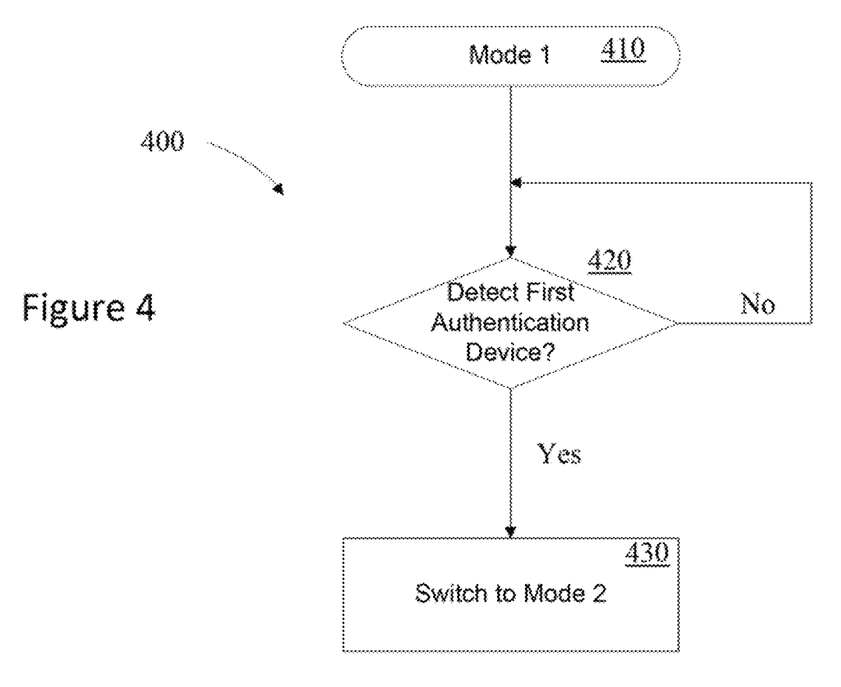
FIGS. 4-6 are flow charts illustrating example processes for transitioning between various modes.
Figure 5:
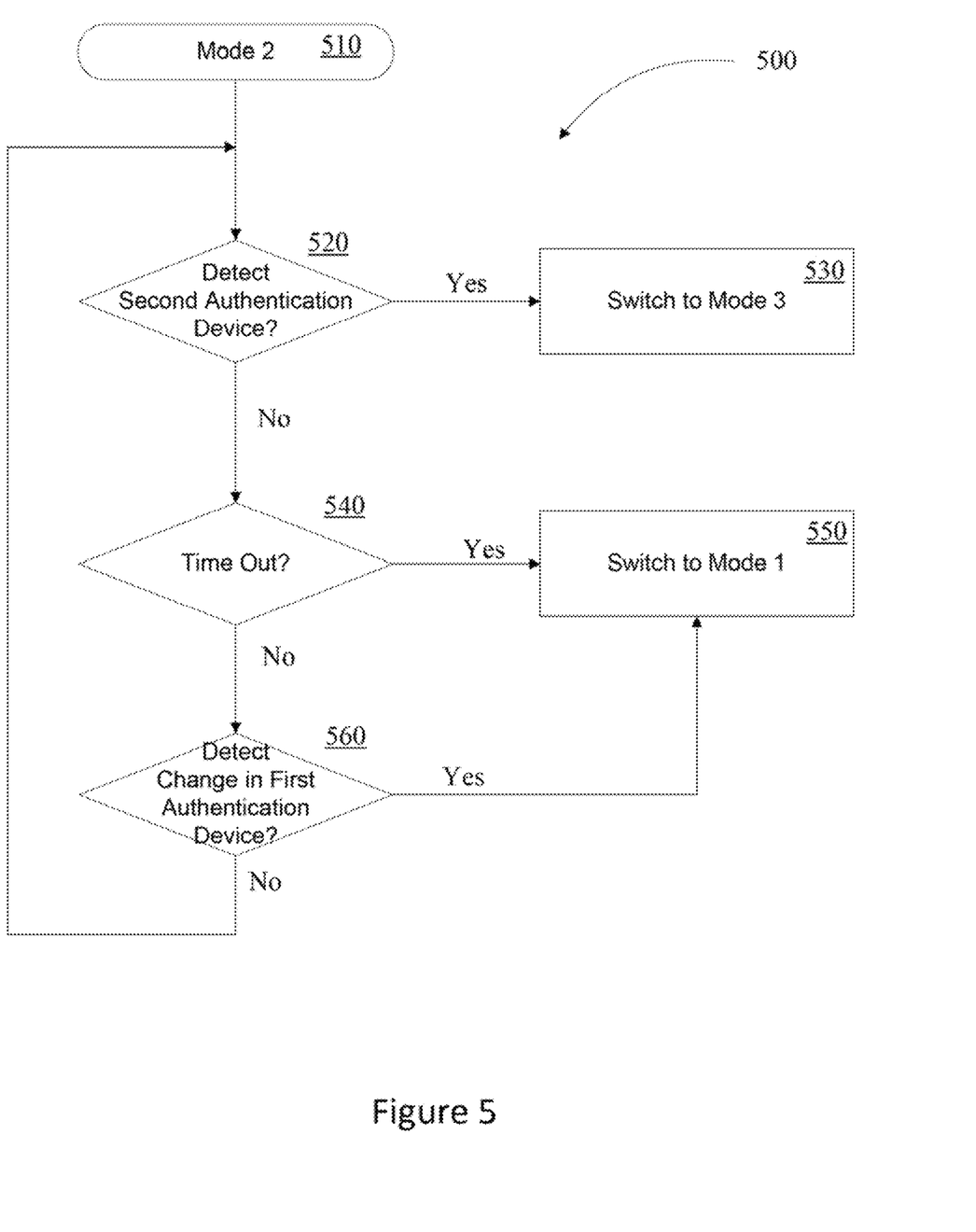
Figure 6:
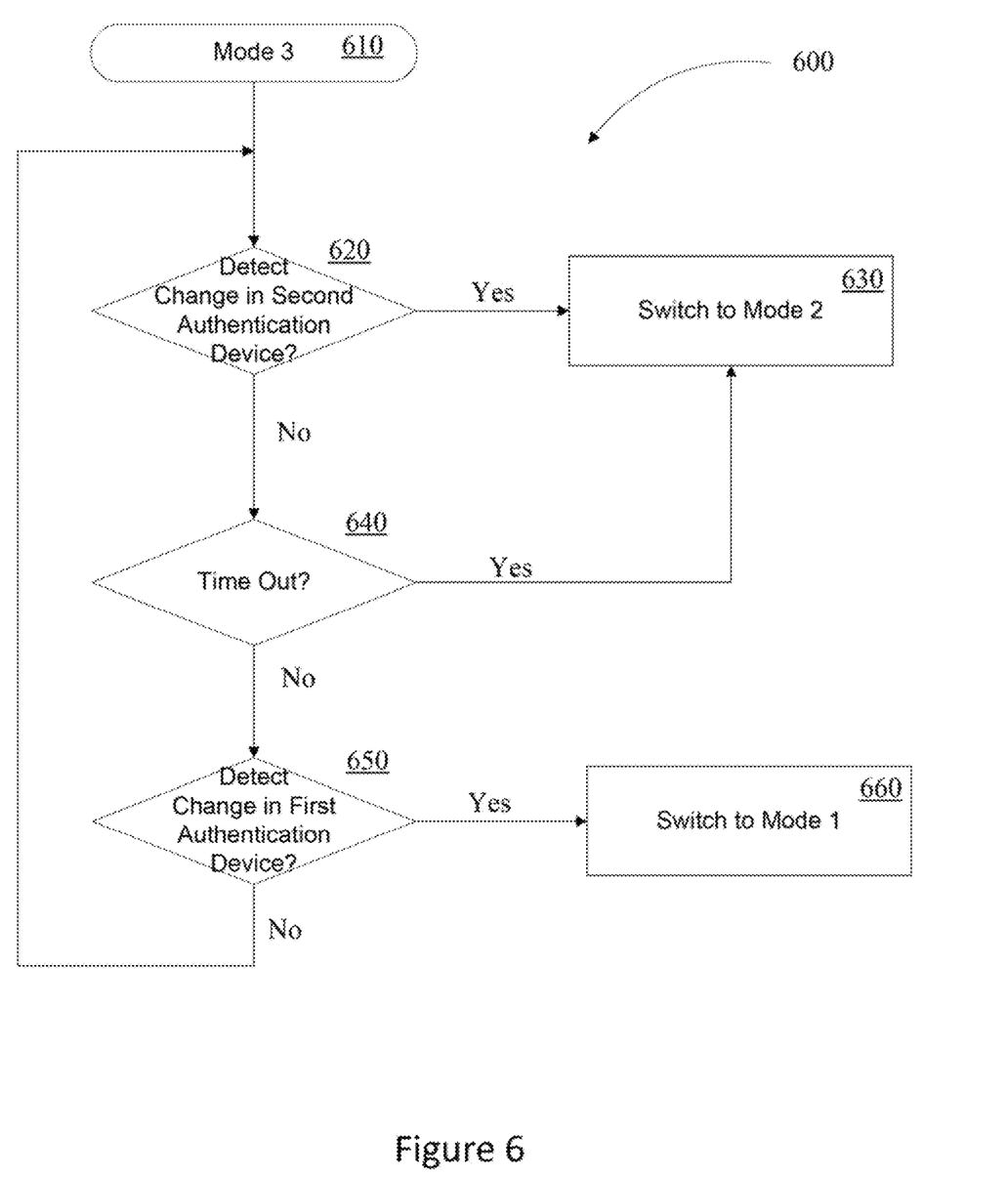

Referring now to FIGS. 4-6, flow charts are provided to illustrate example processes for transitioning between various modes. Referring first to FIG. 4, a flow chart illustrates an example process if the device starts in the first mode 310 (block 410). As noted above, the first mode 310 may correspond to the electronic device being completely shut down. In the example of FIG. 2, the computer 130c may be completely shut down when the user has left work, for example. At block 420, a determination is made as to the detection of a first authentication device. As described above with reference to FIG. 2, the first authentication device may include an RFID tag or other identifier associated located on a user's security badge, for example. The detection at block 420 may include detection of the RFID tag by the RFID sensor 110 at the entrance to the building 210 and conveying of that information to the central controller 120. As described above, the central controller 120 may send a signal to the computer 130c to indicate the detection.

If the determination at block 420 is made that the first authentication device was not detected, the electronic device may remain in the first mode 310 and continue checking for the detection of the first authentication device at, for example, regular intervals. On the other hand, if the first authentication device is detected at block 420, the process proceeds to block 430 and transitions the electronic device to a second mode 320. In the example of FIG. 2, if the user's security badge is detected at the entrance of the building indicating that the user has arrived at the building, the central controller 120 may send a signal to one or more computers, such as computer 130c, associated with the user to indicate that a first level of authentication has been achieved. The computer 130c may then begin the boot up process and may transition to a sleep mode. In some examples, the boot up process may use the user's profile in the boot up process. For example, the user may have a specific desktop, or certain applications shown on the desktop, which may be different from other users who may also be associated with the same computer 130c.

In various examples, in the second mode where only a single level of authentication has been achieved, the computer may remain unusable or locked. At least one additional level of authentication associated with a second authentication device that is different from the first authentication device is needed to allow the computer to be used.

Referring now to FIG. 5, a flow chart illustrates an example process for transitioning of the electronic device from the second mode 320. Those skilled in the art will appreciate that, in other examples, the second mode 320 may be any intermediate mode at which authentication has been achieved at least at one level, but not at all levels necessary to allow use of the electronic device. For example, in some examples, four levels of authentication may be needed to allow use of the computer. In such example, the process of FIG. 5 may be used when the electronic device has passed through one, two or three authentication levels.

Referring again to FIG. 5, the process begins with the electronic device in the second mode 320 (block 510). As noted above, the second mode 320 may correspond to the electronic device being booted up but not accessible. In the example of FIG. 2, the computer 130c may be in sleep mode, for example. At block 520, a determination is made as to the detection of a second authentication device. As described above with reference to FIG. 2, the second authentication device may be a smart phone 222 associated with the user. The detection at block 520 may include establishment of a Bluetooth connection between computer 130c and the user's smart phone 222.

If the determination at block 520 is made that the second authentication device was detected, the process proceeds to block 530 and transitions the electronic device to a third mode 330. In the example of FIG. 2, if the user's smart phone 222 and the computer 130c establish a Bluetooth connection (or other short-distance communication connection), the computer 130c may determine that a second level of authentication has been achieved. The computer 130c may then come out of sleep mode and make itself available to the user. In various examples, the user may be presented with the desktop. In other examples, the user may be presented with a login screen which requires the user to enter a password.

If the determination at block 520 is made that the second authentication device was not detected, the process proceeds to block 540 and determines whether the first level of authentication has timed out. In the example of FIG. 2, a time limit may be set for the user to arrive from the building entrance to the area of the computer 130c. If the time limit has passed, the process proceeds to block 550 and switches the electronic device back to the first mode (e.g., a shutdown mode). The time limit may provide another level of security against unauthorized access to the computer.

If the determination at block 540 is made that the time limit has not lapsed, the process proceeds to block 560 and determines if a change in the first authentication device has been detected. For example, in the example of FIG. 2, the change in the first authentication device may include detection of the user's security badge leaving the building. Thus, the first level of authentication may be de-authenticated, and the electronic device may be returned to the first mode (e.g., the shutdown mode). On the other hand, if no change in the first authentication device is detected, the electronic device remains in the second mode and returns to block 520.

Referring now to FIG. 6, a flow chart illustrates an example process for transitioning of the electronic device from the third mode 320. As noted above, those skilled in the art will appreciate that, in other examples, the third mode 320 may be any final mode at which authentication has been achieved at all necessary levels, and the electronic device is made available to the user. For example, in some examples, four levels of authentication may be needed to allow use of the computer. In such example, the process of FIG. 6 may be used when the electronic device has passed through all four authentication levels.

Referring again to FIG. 6, the process begins with the electronic device in the third mode 330 (block 610). As noted above, the third mode 330 may correspond to the electronic device being accessible to the user. In the example of FIG. 2, the computer 130c may be in fully awake and operation mode, for example. At block 620, a determination is made as to whether a change in the second authentication device has been detected. For example, in the example of FIG. 2, the change in the second authentication device may include termination of the Bluetooth connection between the computer 130c and the user's smart phone 222. Thus, the second level of detection may be de-authenticated, and the electronic device may be returned to the second mode (e.g., the sleep mode).

If the determination at block 620 is made that a change in the second authentication device was not detected, the process proceeds to block 640 and determines whether the second level of authentication has timed out. In the example of FIG. 2, a time limit may be set for user activity on the computer 130c. For example, if no input is received from the user for a predetermined time period (e.g., two hours), the second level of authentication may be timed out. This time limit may provide additional security against, for example, the user leaving his mobile device near the computer and going away from the computer for an extended period. If the time limit has passed, the process proceeds to block 630 and switches the electronic device back to the second mode (e.g., a sleep mode).

If the determination at block 640 is made that the time limit has not lapsed, the process proceeds to block 650 and determines if a change in the first authentication device has been detected. For example, in the example of FIG. 2, the change in the first authentication device may include detection of the user's security badge leaving the building. In this regard, it is possible that the user may leave his smart phone 222 near the computer 130c and leave the building, in this regard, all levels of authentication may be de-authenticated, and the electronic device may be returned to the first mode (e.g., the shutdown mode). On the other hand, if no change in the first authentication device is detected, the electronic device remains in the third mode and returns to block 620.

Thus, use of the computer 130c requires multiple levels of authentication associated with different authentication devices. In the example of FIG. 2, a first level of authentication is based on the user's security badge, and a second level of authentication is based on the user's mobile device. Multiple levels of authentication based on different authentication devices provide additional security against unauthorized access to the electronic device.

Various examples described herein are described in the general context of method steps or processes, which may be implemented in one example by a software program product or component, embodied in a machine-readable medium, including executable instruction, such as program code, executed by entities in networked environments. Generally, program modules may include routines, programs, objects, components, data structures, etc. which may be designed to perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

Software implementations of various examples can be accomplished with standard programming techniques with rule-based logic and other logic to accomplish various database searching steps or processes, correlation steps or processes, comparison steps or processes and decision steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A system, comprising:
   a sensor to detect a first authentication device associated with a user,
   a central controller connected to the sensor to receive an indication of a detection of the first authentication device associated with the user; and
   an electronic device connected to the central controller to:

receive the indication of the detection of the first authentication device associated with the user from the central controller, wherein the electronic device is to initiate a startup upon receiving the indication of the detection of the first authentication device;

detect a second authentication device associated with the user, wherein the electronic device is to transition to a fully operational mode upon detection of the second authentication device; and upon receiving the indication of the detection of the first authentication device and detection of the second authentication device, allow access to the electronic device to the user, and wherein the central controller is to associate the user with the electronic device upon receiving the indication of the detection of the first authentication device.

2. The system of claim 1, wherein the first authentication device is a badge associated with the user and the second authentication device is a mobile device associated with the user.

3. The system of claim 1, wherein the detection of the second authentication device includes establishing a Bluetooth connection between the electronic device and the second authentication device.

4. The system of claim 1, wherein the electronic device is to transition the electronic device to a sleep mode upon receiving the indication of the detection of the first authentication device.

5. A method, comprising:

receiving an indication of a first level of authentication, the first level of authentication being associated with a first authentication device associated with the user, the indication of the first level of authentication associating the user with an electronic device, wherein upon the electronic device receiving the indication of the first level of authentication, initiating a startup of the electronic device;

receiving an indication of a second level of authentication for the electronic device, the second level of authentication being associated with a second authentication device associated with the user, the second authentication device being different from the first authentication device, the indication of the second level of authentication being received by the electronic device, wherein upon receiving the indication of the second level of authentication, transitioning the electronic device to a fully operational mode; and upon receiving the indication of at least the first level of authentication and the second level of authentication, allowing access to the electronic device.

6. The method of claim 5, wherein receiving the indication of the first level of authentication comprises:

receiving an authentication signal from a central controller based on detection of the first authentication device by a sensor.

7. The method of claim 5, wherein the first authentication device is a badge associated with the user and the second authentication device is a mobile device associated with the user.

8. The method of claim 5, wherein the initiating the startup transitions the electronic device to a sleep mode.

9. An electronic device, comprising:

a processor; and a memory device including computer program code, the memory device and the computer program code, with the processor, to cause the electronic device to:

receive an indication from a central controller of a detection of a first authentication device associated with a user, the central controller associating the user with the electronic device, wherein upon the electronic device receiving the indication of detection of the first authentication device, initiate a startup of the electronic device;

detect a second authentication device associated with the user, wherein the electronic device is to transition to a fully operational mode upon detection of the second authentication device; and upon receiving the indication of the detection of the first authentication device and detection of the second authentication device, allow access to the electronic device.

10. The electronic device of claim 9, wherein the indication of the detection of the first authentication device is received from the central controller based on detection of the first authentication device by a sensor.

* * * * *